United States Patent

Heaney et al.

[15] 3,639,048
[45] Feb. 1, 1972

[54] AUTOMATIC RANGING AND FOCUSING PROJECTOR

[72] Inventors: Paul R. Heaney; Gad E. Strubel, both of Rochester, N.Y.

[73] Assignee: Eastman Kodak Company, Rochester, N.Y.

[22] Filed: July 23, 1970

[21] Appl. No.: 57,662

[52] U.S. Cl. .............................................. 353/101, 352/140
[51] Int. Cl. ................................... G03b 3/00, G03b 21/14
[58] Field of Search ............................ 353/69, 101; 352/140

[56] References Cited

UNITED STATES PATENTS 3,249,006   5/1966   Stauffer ............................. 353/101
3,450,883   6/1969   Thomas ............................... 353/69
3,536,392   10/1970  Szymber ............................ 353/101

Primary Examiner—Leonard Forman
Assistant Examiner—Steven L. Stephan
Attorney—Robert W. Hampton and Steve W. Gremban

[57] ABSTRACT

A projector having an optical ranging system for automatically optically sensing the screen-to-lens distance and in response thereto establishing a predetermined film-to-lens distance for placing a projected film image in focus. The projector further has an optical focusing system operative in conjunction with the optical ranging system for sensing the established predetermined film-to-lens distance in the projector, and if any change occurs therein to automatically move the projection lens and/or film to refocus the projected film image.

14 Claims, 9 Drawing Figures

PATENTED FEB 1 1972

3,639,048

PAUL R. HEANEY
GAD E. STRUBEL
INVENTORS

BY Steve W. Grenban
Robert W. Hampton
ATTORNEYS

PAUL R. HEANEY
GAD E. STRUBEL
INVENTORS

PAUL R. HEANEY
GAD E. STRUBEL
INVENTORS

BY Steve W. Trenbow
Robert W. Hampton
ATTORNEYS

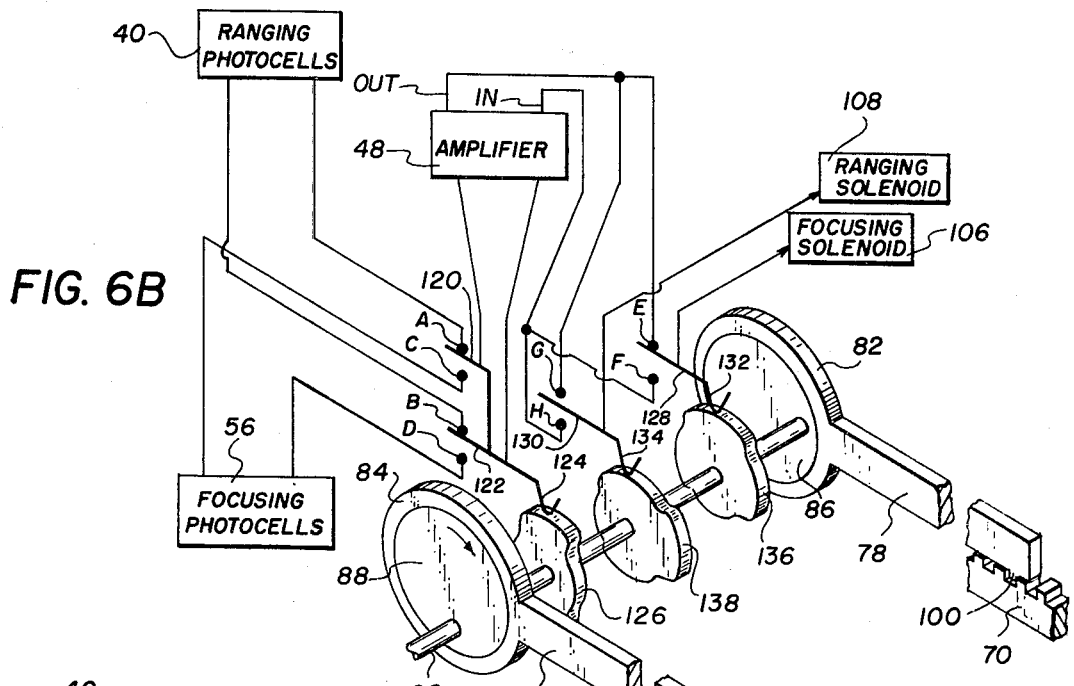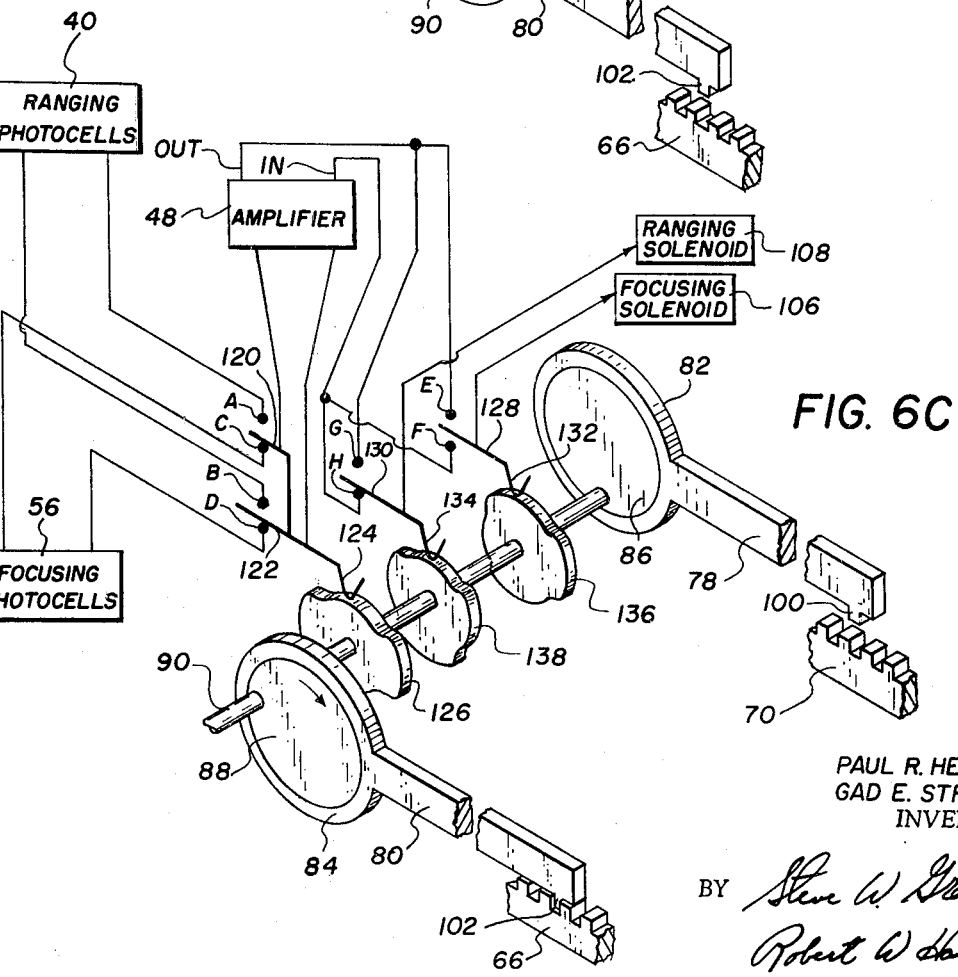

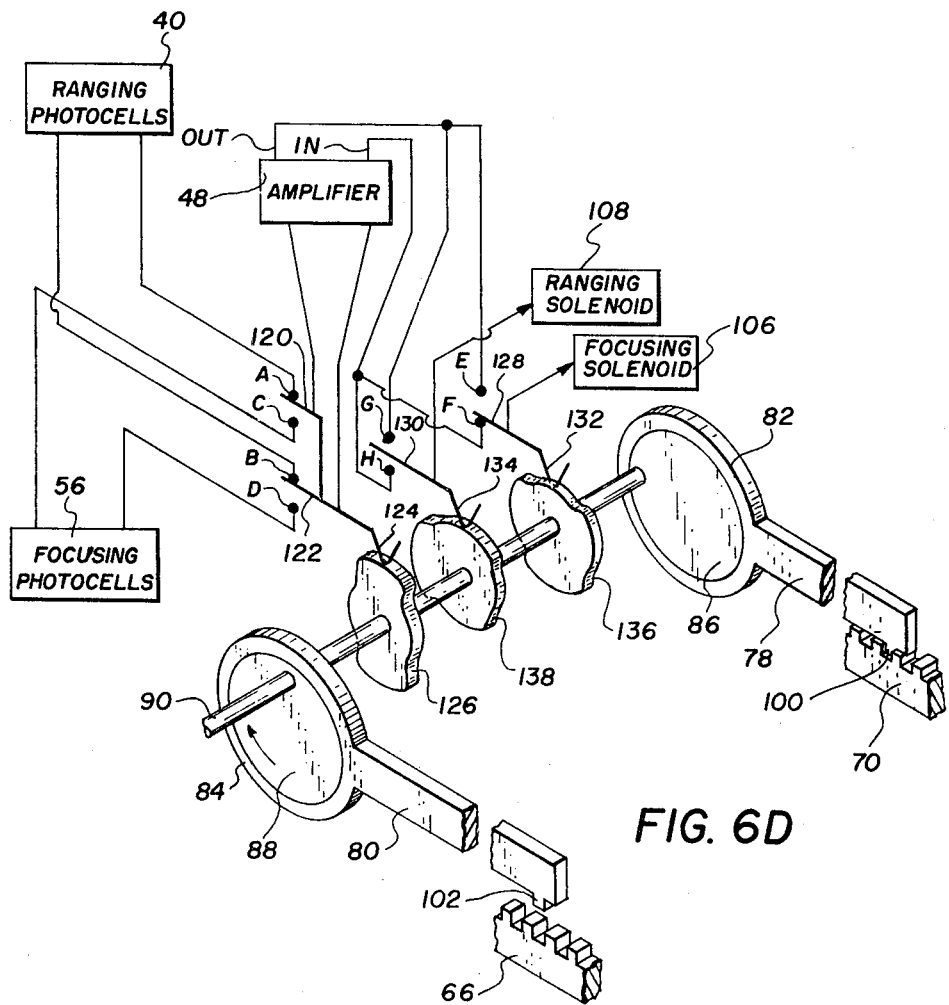

AUTOMATIC RANGING AND FOCUSING PROJECTOR

CROSS REFERENCE TO RELATED APPLICATION

Reference is made to commonly assigned copending U.S. Pat. application Ser. No. 868,695, entitled "Fully Automatic Focusing Projector", filed on Oct. 23, 1969 in the name of Mr. Donald M. Harvey

BACKGROUND OF THE INVENTION

1. Field of the Invention

This invention relates generally to projectors, and more specifically to an automatic ranging and focusing projector having an optical ranging mechanism for initially focusing the projector in response to optical sensing of the screen-to-lens distance, and an optical focusing mechanism operative in conjunction with the ranging mechanism for maintaining the projected film image in focus.

2. Description of the Prior Art

Automatic focusing projectors having optical focusing means to sense the film position along the optical projection axis and to maintain an established distance between the film and the projection lens of the projector in which the film image is in focus are well known in the art. Any distortion or movement of the film along the optical projection axis from its focused position, due to creeping, buckling or popping of the film resulting from heat produced by the projector illumination or the like, is compensated for by adjusting the film-to-lens distance along the optical axis to the established distance to maintain the film image in focus on the screen. In such projectors, it is necessary to initially manually adjust the position of the projection lens along the optical axis to an established film-to-lens distance at which the film image projected on a screen is in focus for a preselected screen-to-lens distance. Such manual focusing of the projector is time consuming and a nuisance. Once the focused condition has been manually obtained for a preselected screen-to-lens distance, in the event a nonfocus situation results due to change in film position, the film image is automatically returned to its focused condition. This is accomplished by the aforementioned focusing means which automatically moves the film or lens to maintain the established film-to-lens distance.

SUMMARY OF THE INVENTION

This invention includes within its scope a fully automatic ranging and focusing projector having an optical ranging system for establishing a proper film-to-lens distance in response to an optically sensed screen-to-lens distance which will place the projected film image of a film positioned in a projection gate in focus on the screen. The projector further has an optical focusing system for refocusing the projected film image in the event it should move out of focus due to any change in film position resulting from creeping, buckling, popping of the slide or the like. The ranging and focusing systems are operatively coupled to moving means for moving one or both of the film or projection lens along the projection axis in response to signals from the optical ranging and focusing systems. The moving means comprises a mechanism for adjustably moving the projection lens or film, and in one embodiment comprises an amplifier and switch means responsive to the signal output of the radiation sensing means of the ranging and focusing systems for producing alternate signal outputs to the ranging and focusing mechanisms.

It is an object of the present invention to provide an automatic ranging and focusing projector that (1) initially optically senses the screen-to-lens distance, (2) in response to the optical sensing automatically establishes a predetermined film-to-lens distance for placing the projected film image in focus on the screen, (3) senses the established predetermined film-to-lens distance, and (4) in the event any change occurs in the established predetermined film-to-lens distance placing the film image out of focus, automatically actuates mechanism for adjustably moving the film and/or lens to refocus the projector.

Another object of the invention is to provide an automatic ranging and focusing projector utilizing a single amplifier for both ranging and focusing functions.

Another object of the invention is to provide a fully automatic ranging and focusing projector that is of simple design and construction, thoroughly reliable and efficient in operation, and economical to manufacture.

The invention and its objects and advantages will become more apparent from the detailed description of the preferred embodiments presented below.

BRIEF DESCRIPTION OF THE DRAWINGS

In the detailed description of the preferred embodiments of the invention presented below, reference is made to the accompanying drawings, in which:

FIGS. 6A, 6B, 6C and 6D are perspective views of a portion of the mechanism of FIG. 4 showing the positions assumed by the projection lens adjustment means at successive 90° intervals of revolution.

DESCRIPTION OF THE PREFERRED EMBODIMENT

Because photographic projectors are well known, the present description will be directed in particular to elements forming part of or cooperating more directly with the present invention, projector elements not specifically shown or described herein being understood to be selectable from those known in the art.

Figure 1:
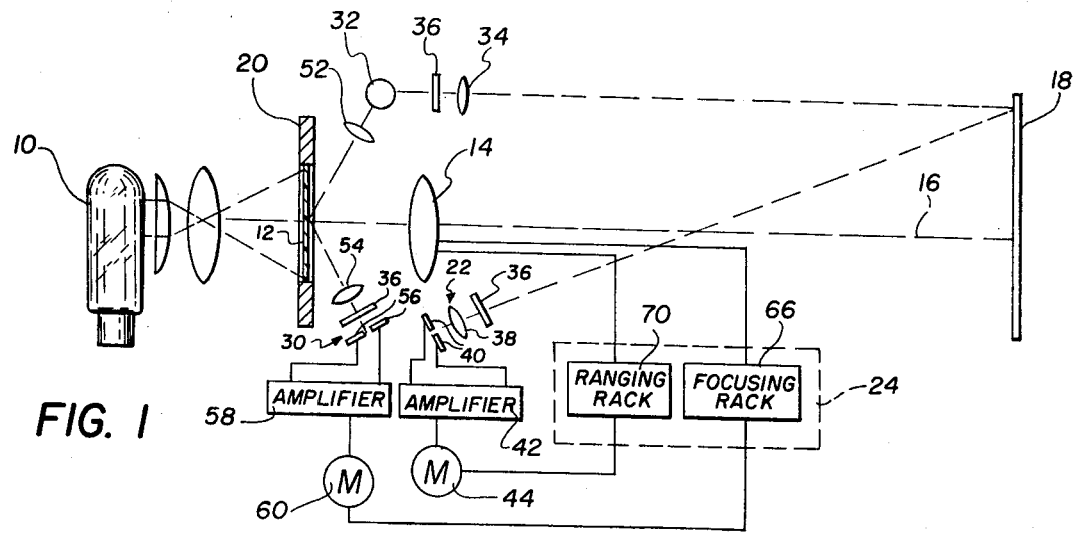
FIG. 1 is a schematic view of an automatic ranging and focusing system for a projector.

As shown in FIG. 1, this invention is useful in any projector having a light source 10 for illuminating a film 12, and any suitable projection lens 14 for projecting the film image along an optical axis 16 onto a screen 18. The film 12 may be in various forms such as in the form of a transparency in a slide mount 20, or a film strip such as used in a motion picture projector.

The automatic ranging and focusing mechanism of this invention as best seen schematically in FIGS. 1-4 essentially comprises an optical ranging system 22 having means for optically sensing the screen 18 to lens 14 distance, and in response thereto actuating an adjusting means 24 coupled to a turret 26 within which lens 14 is mounted for establishing a proper film 12 to lens 14 distance at which the projected film image at a film gate 28 will be in focus on the screen. It further comprises an optical focusing system 30 having means for optically sensing the established film 12 to lens 14 distance, and in response thereto actuating adjusting means 24 for refocusing the film image on the screen in the event the film image moves out of focus due to film displacement along the optical axis caused by creeping, buckling, popping, or the like. Although the ranging and focusing is achieved in the embodiments shown in the drawings by moving turret 26 containing the objective lens 14, it should be readily apparent that at least the focusing could be achieved by moving the film gate 28 containing the film 12 along the optical axis.

The optical ranging system 22 for the projector comprises a radiation source 32 and a signal projection lens 34 for projecting an image of the filament of radiation source 32 onto screen 18. Instead of employing a separate lamp 32 for this purpose as shown in FIG. 1, the projection lamp 10 of the projector may be used in conjunction with suitably placed mirrors, not shown. An optical filter 36 is preferably interposed between lamp 32 and filament projecting lens 34 to filter out the visible portion of the light spectrum preventing visible detection of a ranging signal on the screen. The infrared radiation remaining is directed by ranging lens 38 onto radiation sensing means 40, preferably through another infrared filter 36 to remove ambient visible light. The radiation sensing means 40 are shown as closely spaced radiation sensitive photoelectric cells 40, commonly referred to as photocells. The photocells 40 may be photoresistant devices whose impedance varies with the amount of radiation impinging upon the cell or any suitable photovoltaic device. In the embodiment of the invention shown in FIGS. 1 and 2, the output of the ranging photocells 40 is fed into a differential amplifier 42 and the amplifier output fed to a bidirectional motor 44 drivingly coupled to the projection lens turret 26. In the embodiment of the invention shown in FIGS. 3 and 4, the output of ranging photocells 40 is alternately fed through a switch means 46 to a dual input dual output amplifier 48, and the output of the amplifier intermittently fed through switch means 50 to projection lens adjustment means 24.

The optical focusing system 30 comprises a focusing lens 52 for focusing the filament of lamp 32 onto the surface of film 12 supported by film gate 28, and a reimaging or refocusing lens 54 for refocusing the radiation from the film through an infrared filter 36 which rejects visible ambient light onto radiation-sensing photocells 56 similar to photocells 40. In the embodiment of the invention shown in FIGS. 1 and 2, the output of the focusing photocells 56 is fed into a differential amplifier 58, and the output of the amplifier fed to a bidirectional motor 60 drivingly coupled to the projection lens adjustment means 24. In the embodiment of the invention shown in FIGS. 3 and 4, the output of the focusing photocells 56 is alternately fed through the aforementioned switch means 46 to the amplifier 48, and the output of the amplifier intermittently fed through a switch means 51 to the projection lens adjustment means 24.

Figure 2:
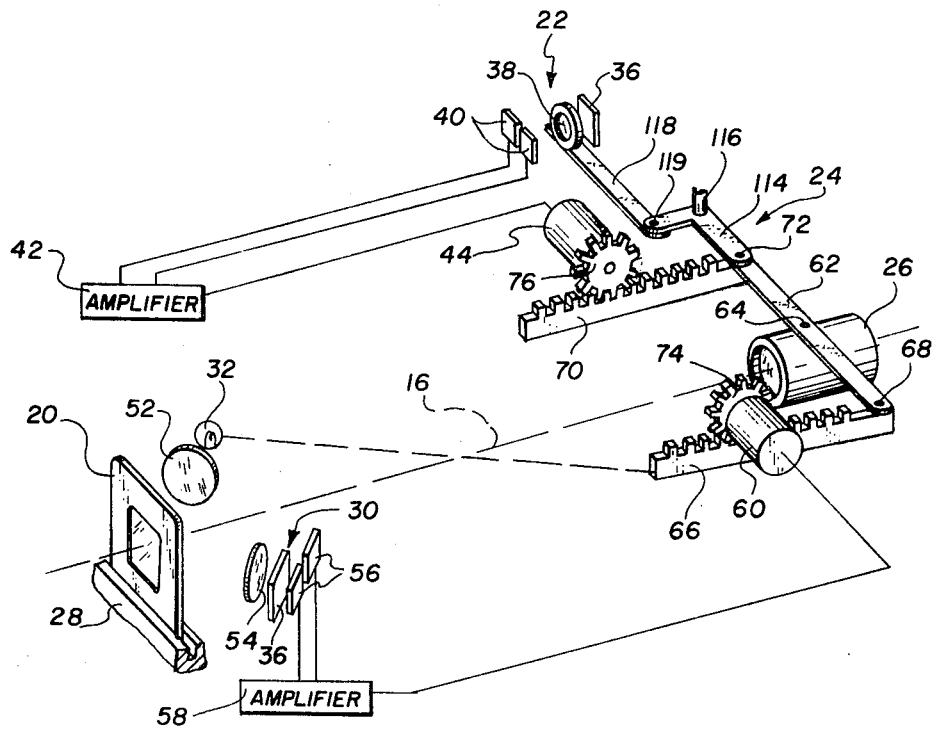
FIG. 2 is a partially schematic view in perspective showing the automatic ranging and focusing mechanism of FIG. 1 in greater detail.
Figure 3:
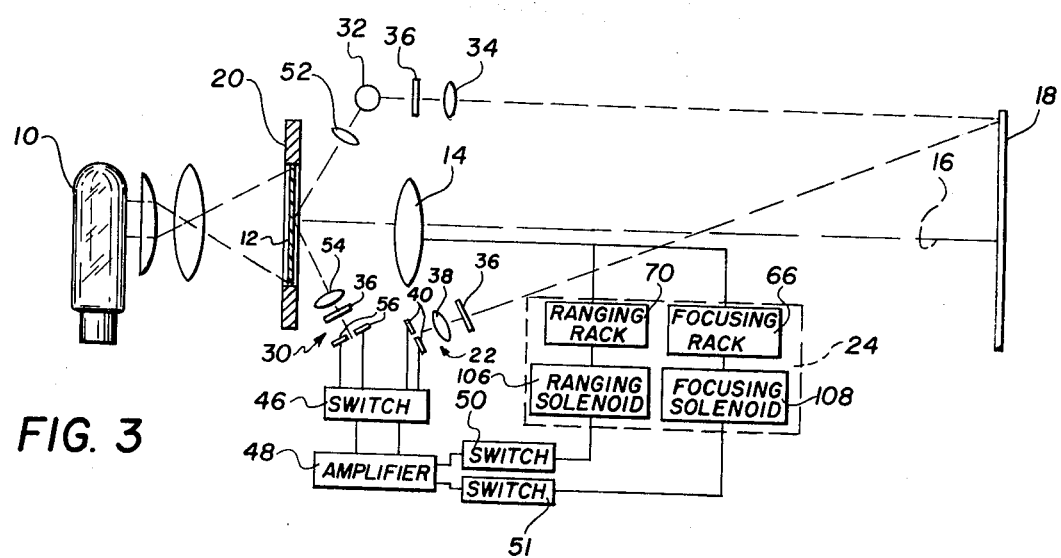
FIG. 3 is a schematic view of another embodiment of an automatic ranging and focusing system for a projector.
Figure 4:
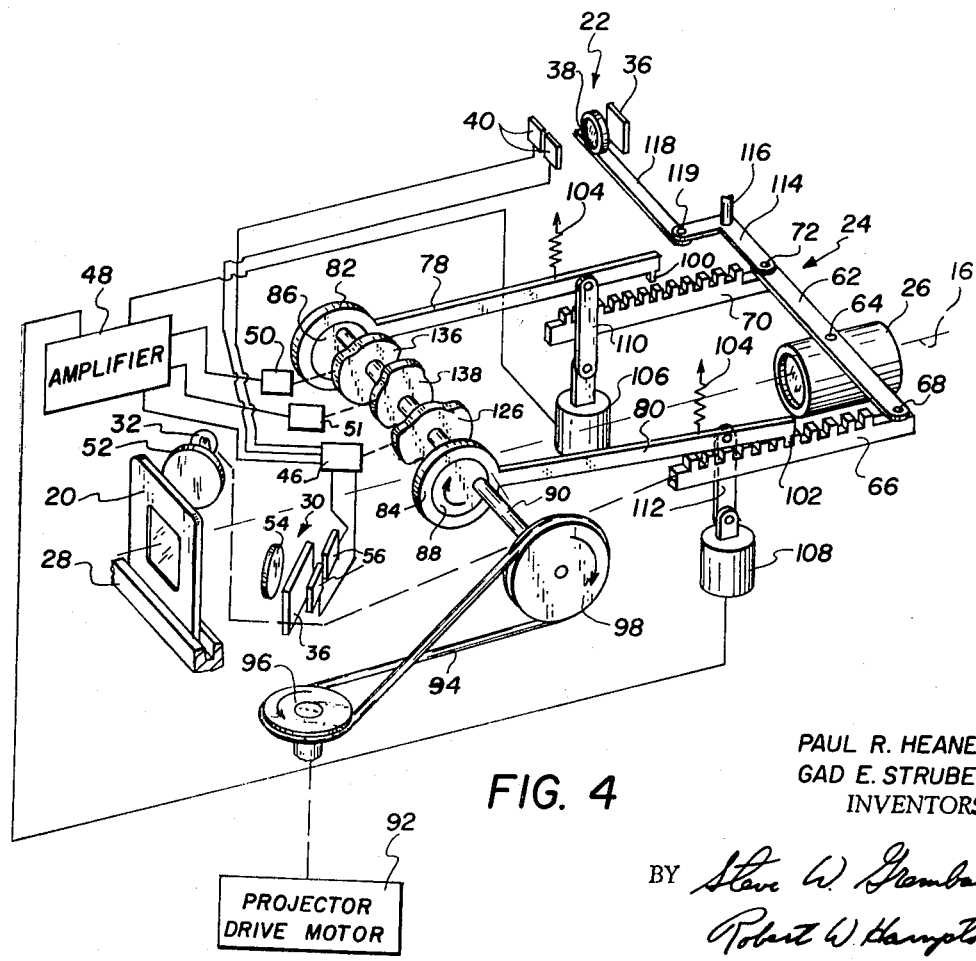
FIG. 4 is a partially schematic view in perspective of an automatic ranging and focusing mechanism for the projector system of FIG. 3.

As best seen in FIGS. 2 and 4, the projection lens adjusting means 24 for moving projection lens turret 26 along the optical axis 16 comprises a lever 62 pivotally mounted at 64 to the projection lens turret 26 and having a focusing rack 66 mounted for reciprocal movement secured to a pivot 68 at one end of lever 62, and a ranging rack 70 mounted for reciprocal movement secured to a pivot 72 at the opposite end 72. In the embodiment of the invention shown in FIGS. 1 and 2 the mechanism for selectively moving the racks 66, 70 comprises drive gears 74, 76 respectively in engagement with the racks and driven by motors 60, 44. In the embodiment of the invention shown in FIGS. 3 and 4, the projection lens adjusting means 24 comprises a pair of levers 78, 80 having collars 82, 84 respectively mounted on eccentric discs 86, 88 respectively secured to a stub shaft 90. The stub shaft is driven by any suitable continuously rotating member such as a projector drive motor 92 through a belt 94 trained over a pulley 96 driven by the projector drive motor 92 and a pulley 98 secured to stub shaft 90. The levers 78, 80 have pawls 100, 102 respectively in the form of projections that are normally kept out of engagement with the racks by any suitable means such as springs 104. A pair of solenoids 106, 108 are provided having links 110, 112 respectively connected to levers 78, 80 respectively, adapted when energized to pivot levers 78, 80 against the bias of springs 104 causing pawls 100, 102 to mesh with the teeth on racks 70, 66 respectively. During such meshing engagement, movement of levers 78, 80 in one direction or the other by virtue of the rotating eccentric discs 86, 88 respectively will move racks 70, 66 and projection lens 26 in one direction or the other. A bell crank 114 pivotal on shaft 116 has one arm pivotally secured by pin 72 to ranging rack 70 and lever end 72, and another arm pivotally connected by a pin 119 to a lever 118 supporting ranging lens 38. Movement of the ranging rack 70 in one direction or the other laterally moves the ranging lens 38 relative to the photocells 40.

The amplifiers 42, 48, 58 may be any suitable high-gain dual input—dual output differential amplifiers of known type. When the radiation is focused at a "null" point between the photocells 40, 56, the cells are equally irradiated and have approximately the same resistance so that the electrical signal or voltage supplied to the inputs of the amplifier is approximately equal yielding no output from the amplifier. With reference to the embodiment shown in FIGS. 3 and 4, as the radiation shifts onto one of the pairs of cells 40, 56 and away from the other cell, an "in" or "out" signal is generated which is alternately fed through switch means 46 to corresponding "in" or "out" inputs to the amplifier 48, and the amplifier in turn, generates corresponding "in" or "out" outputs which are intermittently fed through switch means 50, 51 to the appropriate solenoid 106, 108 for enabling the adjusting means 24 for movement in an "in" or "out" direction to reposition the radiation at the "null" point between the photocells. By virtue of the aforementioned switch means 50, 51, the "in" output from the amplifier 48 is connected to one of the solenoids 106, 108 for energizing the solenoid only when the corresponding eccentric 86, 86 is pulling the corresponding rack 70, 66 in or toward the film 12 in the projector. Also, the "out" output from the amplifier 48 is connected to one of the solenoids 106, 108 for energizing the solenoid only when the corresponding eccentric 86, 88 is pushing the corresponding rack out or away from the film 12 in the projector. The solenoids 106, 108 are deenergized and the adjusting means 24 disabled during the time intervals that the switch means 46, 50 and 51 are in an open circuit condition or the outputs of the amplifier 48 are substantially zero or of insufficient value to energize the solenoids.

Figure 5:
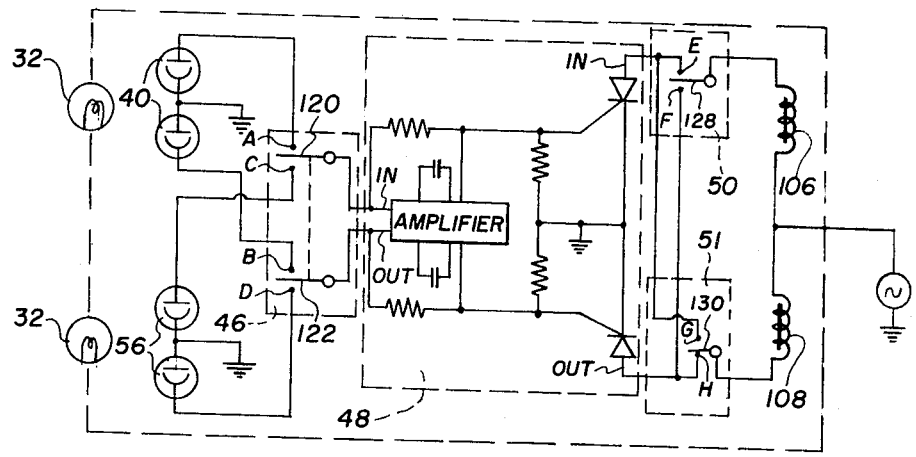
FIG. 5 is an electrical wiring diagram for the automatic ranging and focusing mechanism of FIG. 4.
Figure 6A:
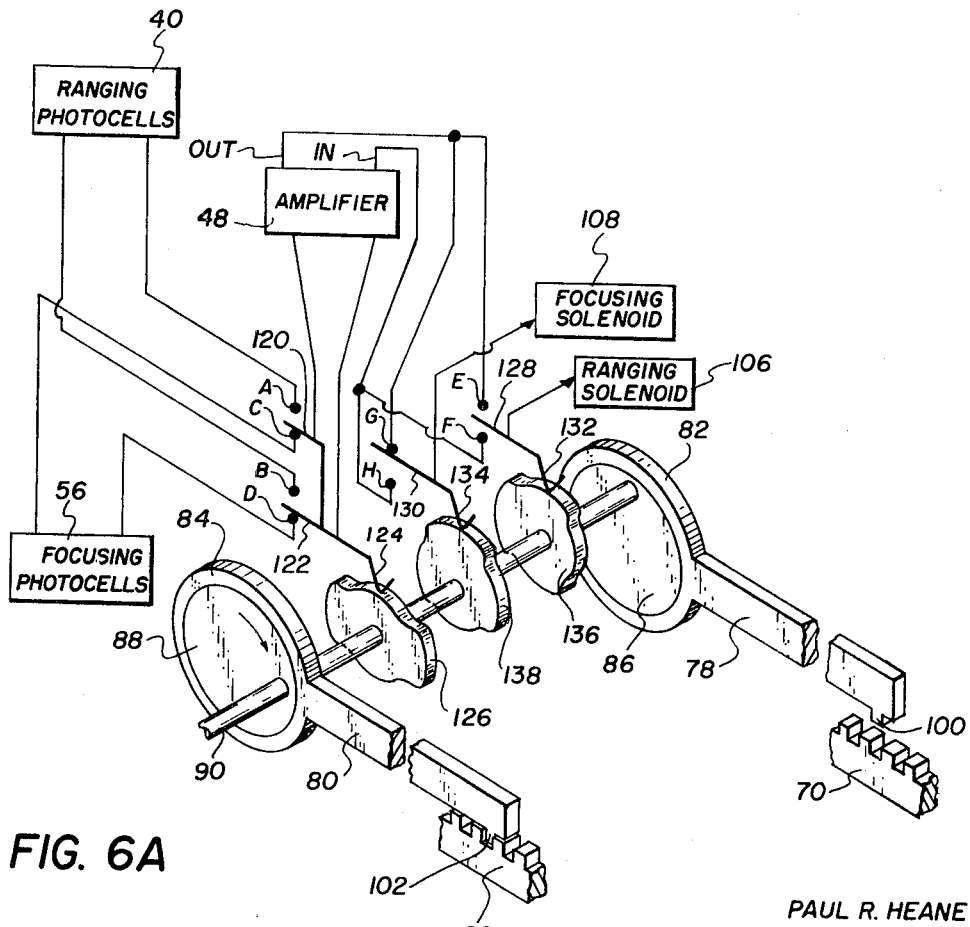

The ranging and focusing solenoids 106, 108 respectively are energized in timed relation to the reciprocal movement of the levers 70, 66 respectively and the aforementioned switch means 50, 51 which intermittently connect the "in" and "out" outputs of the amplifier 48 to the solenoids. As best seen in FIG. 5, the switch means 46 comprises a double pole-double throw switch having movable contacts 120, 122 connected to the "in" and "out" inputs of the amplifier 48 and alternately movable into engagement with fixed contacts A, B and C, D for alternately electrically connecting the ranging and focusing photocells 40, 56 respectively to the amplifier 48. The movable contacts 120, 122 of switch means 46 are secured to an insulator, not shown, for joint movement, and such contacts 120, 122 are moved between their two positions in engagement with contacts A, B or C, D by a cam follower 124 (see FIG. 6) secured to the insulator, and riding on the periphery of a corresponding cam 126 secured to shaft 90. The switch means 50, 51 each comprise single pole-double throw switches having movable contacts 128, 130 respectively electrically connected to the ranging and focusing solenoids 106, 108 respectively. Movable contact 128 is alternately movable into engagement with fixed contacts E, F and movable contact 130 alternately movable into engagement with contacts G, H for alternately electrically connecting the "in" and "out" outputs of the amplifier 48 to the ranging and focusing solenoids 106, 108 respectively. The movable contacts 128, 130 of the switch means 50, 51 respectively are moved integral with contacts 128, 130 and riding on the periphery of corresponding cams 136, 138. Accordingly, for each rotation of stub shaft 90, the movable contacts 120, 122, 128 and 130 will alternately move between the positions A, C; B, D; E, F; and G, H respectively a predetermined number of times in timed relation depending upon the cam logic or configuration and phasing of the cams 126, 136 and 138. By virtue of such cam logic, it is possible as seen in FIGS. 3–6 to utilize only one amplifier 48 for both the ranging and focusing functions. To accomplish this, the eccentric discs 86, 88 are mounted on the projector shaft in an out-of-phase condition with the ranging eccentric 86 lagging the focusing eccentric 88 by 90°. As a result of this phase relationship between the eccentric discs 86, 88, it is possible for switch means 46 to alternately electrically connect the ranging and focusing photocells 40, 56 respectively to the inputs of the amplifier 48, and the switch means 50, 51 to alternately connect any corresponding amplifier "in" and "out" outputs generated thereby to the appropriate ranging and focusing solenoids 106, 108 respectively. For example, with reference to FIG. 6A, with shaft 90, cams 126, 136, 138 and eccentric discs 86, 88 in the initial positions shown, the closed switch contacts 120, C and 122, D connect the output of the focusing photocells 56 to the inputs of the amplifier 48, and disconnects the output from ranging photocells 40 from amplifier 48. Closed switch contacts 130, G connect any "out" output of the amplifier 48 to the focusing solenoid 108. Switch contact 128 is in an open position disconnecting amplifier 48 from ranging solenoid 106. Upon rotation of shaft 90 through an angle of 90° as shown in FIG. 6B, switch contacts 120, 122 disconnect the focusing photocells 56 from the inputs to amplifier 48, and closed contacts 120, A and 122, B connect the output of the ranging photocells 40 to the inputs of amplifier 48. In addition, switch contact 130 disconnects the "out" output of amplifier from focusing solenoid 108, and closed switch contacts 128, E connect any "out" output of amplifiers 48 to ranging solenoid 106. When the shaft 90 is rotated through another 90° for a total angle of 180° to the position seen in FIG. 6C, contacts 120, 122 disconnect ranging photocells 40 from amplifier 48, and connect focusing photocells 56 thereto through contacts C, D. Switch contact 128 disconnects the "out" output of amplifier 48 from ranging solenoid 106, and closed switch contacts 130, H connect the "in" output of amplifier 48 to focusing solenoid 108. Continued rotation of the shaft through another 90° and a total angle of 270° to the position shown in FIG. 6D causes switch contacts 120, 122 to disconnect focusing photocells 56 from amplifier 48 and to connect ranging photocells 40 thereto through contacts A and B. Also, switch contact 130 disconnects the "in" output of amplifier 48 from focusing solenoid 108, and closed switch contacts 128, F connects the "in" output of the amplifier to ranging solenoid 106. This situation prevails for another 90° rotation for a total of 360° at which point the shaft is once again in its initial position as shown in FIG. 6A and the operation is repeated.

In the operation of the ranging and focusing mechanism of FIGS. 3-6, initially the automatic ranging system 22 senses the screen 18 to lens 14 distance and through successive rotations of shaft 90 and movement of rack 70 establishes a predetermined film 12 to lens 14 distance at which the film image on screen 18 is in focus. In accomplishing this, an image preferably infrared, of the filament of lamp 32 is superimposed over the slide image on screen 18 and is reimaged by ranging lens 38 onto ranging photocells 40. If the film image being projected on screen 18 is in focus, the infrared radiation will strike the area between the ranging photocells 40 (null condition) and both cells will be activated to the same degree resulting in no appreciable signal fed from the outputs of amplifier 48. If an out-of-focus condition exists, the infrared radiation will strike one or the other of the ranging photocells 40 causing an "in" or "out" signal to be fed to the inputs of amplifier 48, and corresponding "in" and "out" outputs to be fed through switch 50 to ranging solenoid 106. Due to the aforementioned switch 46, the "in" output from amplifier 48 is connected to solenoid 106 only when ranging rack 70 is at zero velocity and eccentric 86 is pulling ranging rack 70 toward the film 12. Also, the "out" output from amplifier 48 is connected to solenoid 106 only when ranging rack 70 is at zero velocity and eccentric 86 is pushing the rack away from film 12. The solenoid 106 is deenergized and projection 100 withdrawn from rack 70 during the time interval that switch 46 is open or the output of amplifier 48 is substantially zero. If an unbalanced condition exists which is normally the case when the projector is initially set up and turned on, the ranging rack 70 is moved in or out to correct such imbalance, movement of rack 70 causing ranging lens 38 to be moved laterally relative to photocells 40 by virtue of bell crank 118 until the infrared radiation impinges equally on both cells (null condition) at which point the film image is in focus. Once the correct range has been achieved, the film image is maintained in focus by the automatic focusing system 30. In the focusing system, the filament of lamp 32 is imaged by lens 52 on the central portion of film 12 and reimaged by lens 54 onto the focusing photocells 56. These photocells are connected through switch 46 to amplifier 48, and when the radiation activates the photocells equally (null condition) no signal is fed from amplifier 48. However, if one or the other of the photocells 56 is irradiated due to an out-of-focus condition resulting from slide popping, or the like, an "in" or "out" signal is fed to amplifier 48 and a corresponding "in" and "out" output is generated and fed through switch 51 to focusing solenoid 108. Energization of solenoid 108 causes projection 102 to be moved into engagement with focusing rack 66 for moving the rack and projection lens 14 in the proper direction for refocusing the film image. The lamp 32 is coupled to focusing rack 66 by any suitable means such that movement of projection lens 14 to a position in which the film image is in focus also moves lamp 32 so that the radiation directed onto film 12 and redirected onto photocells 56 will strike the photocells at the null point where they are both equally activated.

The invention has been described in detail with particular reference to preferred embodiments thereof, but it will be understood that variations and modifications can be effected within the spirit and scope of the invention.

We claim:

1. In a projector for projecting an image onto a screen along an optical axis and having a film gate for receiving a film, illumination means for illuminating the film, and a projection lens movable along the optical axis for projecting the illuminated film image onto the screen, the combination comprising:
   first means for sensing the screen-to-lens distance;
   second means responsive to said first means for moving said lens to establish a predetermined film-to-lens distance at which said projected film image on said screen is in focus comprising a ranging rack coupled to said lens, and ranging rack moving means comprising a first lever having a ranging rack engaging projection, a first solenoid for moving said first projection into meshing engagement with said ranging rack, and a first eccentric for reciprocally moving said ranging rack;
   third means operative alternately with said first means for sensing said predetermined film-to-lens distance; and
   fourth means responsive to said third means upon any change in said predetermined film-to-lens distance due to film movement along the optical axis for moving one of said lens and film to reestablish said predetermined film-to-lens distance, refocusing said projected film image on said screen.

2. The invention according to claim 1 wherein said fourth means comprises a focusing rack coupled to said lens and means for moving said focusing rack.

3. The invention according to claim 1 wherein said fourth means comprises a focusing rack coupled to said lens, and said focusing rack moving means comprises a pinion in engagement with said focusing rack and a bidirectional motor drivingly coupled to said pinion.

4. The invention according to claim 1 wherein said fourth means comprises a focusing rack coupled to said lens, and focusing rack moving means comprising a second lever having a focusing rack engaging projection, a second solenoid for moving said second projection into meshing engagement with said focusing rack and a second eccentric for reciprocally moving said focusing rack.

5. The invention according to claim 1 wherein said first means comprises a first pair of photosensitive elements for producing an electrical output, and said second means further comprises first switch means for selectively connecting the electrical output of said first pair of photosensitive elements to said first solenoid.

6. The invention according to claim 5 wherein said first switch means comprises an intermittently operated switch.

7. The invention according to claim 5 wherein said first switch means selectively connects the electrical output of timed relation to the reciprocal movement of said ranging rack.

8. The invention according to claim 7 wherein said third means comprises a pair of second photosensitive elements for producing an electrical output, and said fourth means comprises a second moving means for moving said lens, and a second switch means for selectively connecting the electrical output of said pair of second photosensitive elements to said second moving means.

9. The invention according to claim 8 wherein said second switch means comprises an intermittently operated switch.

10. The invention according to claim 8 wherein said second moving means comprises a focusing rack coupled to said optical projection means, a second lever having a second rack engaging projection, a second solenoid for moving said second projection into meshing engagement with said focusing rack, and a second eccentric for reciprocally moving said focusing rack, and leading said first eccentric by 90°, and said second switch of second photosensitive elements to said second solenoid in timed relation to the reciprocal movement of said focusing rack.

11. The invention according to claim 1 wherein said first means comprises a pair of first photosensitive elements for producing in electrical output, and said second means further comprises a first switch means for selectively connecting the electrical output of said first pair of photosensitive elements to said first solenoid, said third means comprises a pair of second photosensitive elements for producing an electrical output, said fourth means comprises a second moving means for moving said lens, and a second switch means for selectively connecting the electrical second moving means.

12. The invention according to claim 11, further including an amplifier, a third switch means for alternately connecting said first and third means to the input of said amplifier, and said first and second switch means selectively connects the output of said amplifier to said firs$ and second solenoids.

13. The invention according to claim 12 wherein said first and second switch means each comprises a pair of switch contacts connected to the output of said amplifier, a first cam mounted on said shaft, and a first switch actuator said pair of contacts to one of said first and second solenoids, and said third switch means comprises a pair of switch contacts connected t each of said pairs of first and second photosensitive elements, a second cam mounted on said shaft, and a pair of second switch actuators responsive to said second cam for alternately connecting said pairs of first and second photosensitive elements to the inputs of said amplifier.

14. In a projector for projecting an image onto a screen along an optical axis and having a film gate for receiving a film, illumination means for illuminating the film, and an objective lens movable along the optical axis for projecting the illuminated film image onto the screen, the combination comprising:
   first means including a movable ranging lens for sensing the screen-to-objective lens distance;
   second means responsive to said first means for moving said objective lens to establish a predetermined film-to-objective lens distance at which said projected film image on said screen is in focus;
   said second means comprising a movable ranging rack coupling said objective lens to said ranging lens and causing relative movement between said objective lens and said ranging lens upon movement of said ranging rack, a lever having a ranging rack engaging projection, a solenoid for moving said projection into meshing engagement with said ranging rack, and an eccentric for reciprocally moving said ranging rack;
   third means for sensing said predetermined film-to-objective lens distance; and
   fourth means responsive to said third means upon any change in said predetermined film-to-objective lens distance due to film movement along the optical axis for moving one of said objective lens and film to reestablish said predetermined film-to-objective lens distance refocusing said projected film image on said screen.

* * * * *

PO-1050
(5/69)

UNITED STATES PATENT OFFICE
CERTIFICATE OF CORRECTION

Patent No. 3,639,048          Dated February 1, 1972

Inventor(s) Paul R. Heaney and Gad E. Strubel

It is certified that error appears in the above-identified patent and that said Letters Patent are hereby corrected as shown below:

Column 7, Line 2, after "of" insert ---said pair of first photosensitive elements to said first solenoid in---.

Column 7, Line 21, after "switch" insert ---means selectively connects the electrical outputs of said pair---.

Column 7, Line 33, after "electrical" insert ---output of said pair of second photosensitive elements to said---.

Column 7, Line 38, delete "firs$" and insert ---first---.

Column 8, Line 3, after "actuator" insert ---responsive to said first cam for selectively connecting one of---.

Signed and sealed this 18th day of July 1972.

(SEAL)
Attest:

EDWARD M. FLETCHER, JR.          ROBERT GOTTSCHALK
Attesting Officer                   Commissioner of Patents